(12) United States Patent
Kim et al.

(10) Patent No.: US 8,844,998 B2
(45) Date of Patent: Sep. 30, 2014

(54) SEAT APPARATUS FOR VEHICLE

(75) Inventors: Sang Ho Kim, Incheon (KR); Sang Do Park, Ansan-si (KR); Deok Soo Lim, Hwaseong-si (KR); Bong Ku Kim, Hwaseong-si (KR); Soo Hyun Moon, Hwaseong-si (KR); Chang Oan Woo, Hwaseong-si (KR); Jun Yeol Heo, Suwan-si (KR); Youn Myung Joo, Suwon-si (KR)

(73) Assignees: Kia Motors Corporation, Seoul (KR); Faurecia Automotive Seating Korea, Suwon-Si (KR)

( * ) Notice: Subject to any disclaimer, the term of this patent is extended or adjusted under 35 U.S.C. 154(b) by 0 days.

(21) Appl. No.: 13/531,066

(22) Filed: Jun. 22, 2012

(65) Prior Publication Data
US 2013/0113233 A1 May 9, 2013

(30) Foreign Application Priority Data
Nov. 4, 2011 (KR) .......................... 10-2011-0114325

(51) Int. Cl.
*B60N 2/10* (2006.01)
*B60N 2/36* (2006.01)
*B60N 2/30* (2006.01)

(52) U.S. Cl.
CPC .......... *B60N 2/3031* (2013.01); *B60N 2/3065* (2013.01); *B60N 2/3079* (2013.01); *B60N 2/309* (2013.01)
USPC ........... 296/65.09; 296/69; 297/15; 297/334; 297/335

(58) Field of Classification Search
USPC ............ 296/65.05, 65.09, 65.66, 69; 297/15, 297/326, 331, 333–335
See application file for complete search history.

(56) References Cited

U.S. PATENT DOCUMENTS 6,932,424 B2   8/2005   Rhodes et al.
8,091,945 B2 *  1/2012  Hancock et al. ........... 296/65.06

FOREIGN PATENT DOCUMENTS

| JP | 06-219197 A | 8/1994 |
| JP | 2000-168412 A | 6/2000 |
| JP | 2001-47916 A | 2/2001 |
| JP | 2001-239870 A | 9/2001 |
| JP | 2002-240607 A | 8/2002 |
| KR | 1020010058930 A | 7/2001 |

* cited by examiner

*Primary Examiner* — Dennis H Pedder
*Assistant Examiner* — Beverly Becker
(74) *Attorney, Agent, or Firm* — Morgan, Lewis & Bockius LLP (57) ABSTRACT

A seat apparatus for a vehicle, in which a seat back may be foldable toward a seat cushion of a seat, may include a storage space provided at the bottom of a floor and storing the seat to provide a luggage space in the vehicle, a link member pivotally connected between a cushion link of the seat cushion and the storage space such that the seat may be foldable to be stored in the storage space, a locking device provided on the seat back to maintain an unfolded or folded state of the seat back, and an elastic member provided on the link member to pop up the cushion link and the seat back out of the storage space when the seat back may be unfolded.

6 Claims, 8 Drawing Sheets

<Seat mode> <Luggage mode>

1. Locking is released when release lever is pulled

2. Seat is moved toward seating position by spring force

3. Front end of seat back is pulled to be locked and used as seat mode

FIG. 9

SEAT APPARATUS FOR VEHICLE

CROSS-REFERENCE TO RELATED APPLICATION

The present application claims priority to Korean Patent Application No. 10-2011-0114325 filed Nov. 4, 2011, the entire contents of which is incorporated herein for all purposes by this reference.

BACKGROUND OF THE INVENTION

1. Field of the Invention

The present invention relates to a seat apparatus for a vehicle. More particularly, it relates to a seat apparatus for a vehicle, which has a seat back which can be folded toward a seat cushion.

2. Description of Related Art

With the increase in weekend leisure activities, the number of items people carry during their long-distance travel also increases requiring a space for passengers as well as those for their luggages. As a result, there has been a growing use of multi-purpose vehicles (MPVs), which can load various equipments required for sports or leisure activities.

Particularly, in an eleven-passenger vehicle provided with four rows of seats, various seat functions are implemented to provide a luggage space, In the prior art, various types of technologies have been proposed to provide the luggage space in a rear seat of the vehicle in such a manner that a storage space is provided in a floor such that the rear seat can be stored in the storage space.

For example, U.S. Pat. No. 6,997,498 discloses a seat device for a vehicle, in which a seat can be stored in a storage formed to be concave using an X type link or damper.

Moreover, U.S. Pat. No. 7,328,930 discloses a vehicle seat which can be folded down to a floor by a pair of links.

Figure 1:
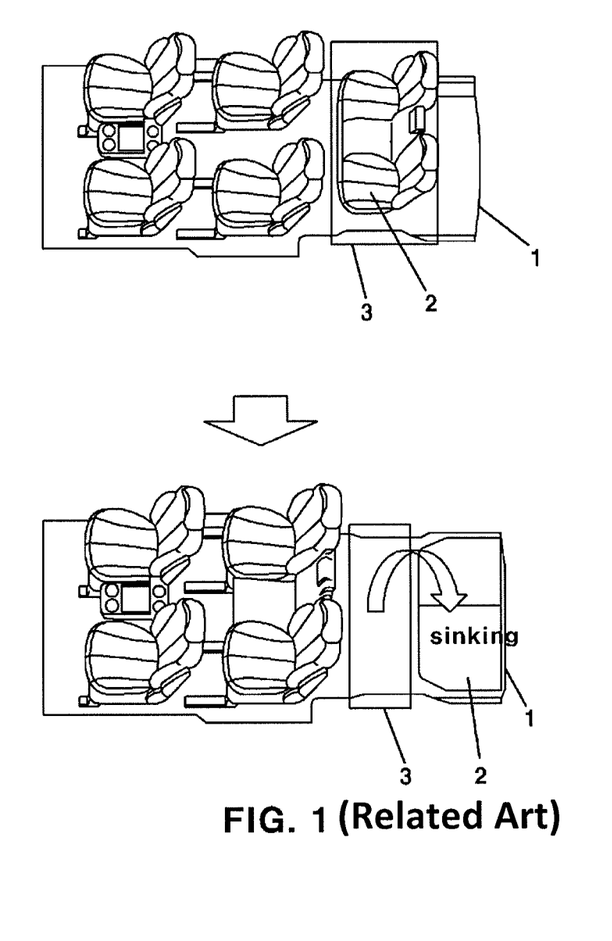
FIG. 1 is a schematic perspective view showing the structure of a seat apparatus for a multi-purpose vehicle in accordance with a prior art, in which a storage space and a seat can be separated.

Furthermore, a seat structure in a multi-purpose vehicle is disclosed as shown in FIG. 1, in which a storage space 1 and a seating position 3 of a seat 2 can be separated.

Figure 2:
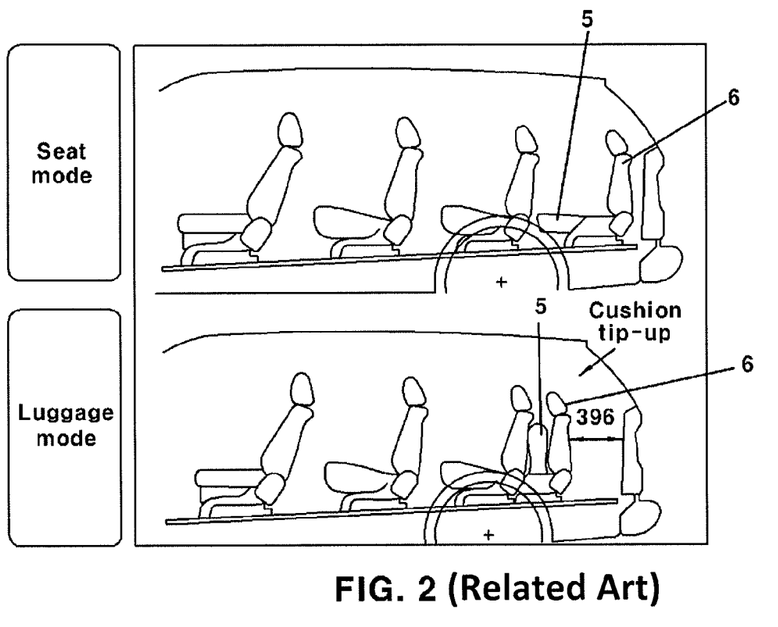
FIG. 2 is a schematic side view showing the structure of a cushion tip-up type seat apparatus for a multi-purpose vehicle in accordance with a prior art.

Lastly, a seat structure having four rows of seats is disclosed as shown in FIG. 2, in which the front end of a seat cushion 5 is rotated and tipped up toward a seat back 6 and brought into the closest contact with a seat back 6 of a third row using a slide rail mounted on a floor.

However, although the vehicle provided with three rows or four rows of seats can implement various seat functions to provide a luggage space, the vehicle provided with four rows of seats has one row of seats more than the three rows of seats, and thus there are difficulties in providing a sufficient luggage space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat apparatus for a vehicle, in which a rear seat can be folded and moved down by simple manipulation using a plurality of link members, thereby providing sufficient luggage space and passenger space.

In an aspect of the present invention, a seat apparatus for a vehicle, in which a seat back is foldable toward a seat cushion of a seat, may include a storage space provided at the bottom of a floor and storing the seat to provide a luggage space in the vehicle, a link member pivotally connected between a cushion link of the seat cushion and the storage space such that the seat is foldable to be stored in the storage space, a locking device provided on the seat back to maintain an unfolded or folded state of the seat back, and an elastic member provided on the link member to pop up the cushion link and the seat back out of the storage space when the seat back is unfolded.

The seat apparatus may include a release lever provided on the seat back to release the locking device such that, when the locking device is released, the seat is folded or unfolded and, at the same time, moved up.

The link member may include a first link pivotally connected to a front end of the cushion link to be moved up and down, second and third links connected to the first link and the storage space and pivotally supporting the first link, and a fourth link connected between a rear end of the cushion link and the storage space and pivotally supporting the rear end of the cushion link to be moved up and down.

The link member may further include a folding guide link pivotally connected to a lower end of the seat back and a lower end of the first link, the folding guide link pulling the lower end of the first link such that the first, second and third links are folded when the seat back is folded.

The seat apparatus may further include first and second stoppers provided on the first link and selectively engaged with the second and third links respectively to fix the positions of the cushion link and the seat back, wherein when the seat is moved up and unfolded, the first link rotates and is then stopped by the first and second stoppers, and thus the upward movement and unfolding of the seat is stopped.

The elastic member is connected to the first link and the third link, wherein the elastic member is a torsion bar.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings includes reference to the following elements as further discussed below.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
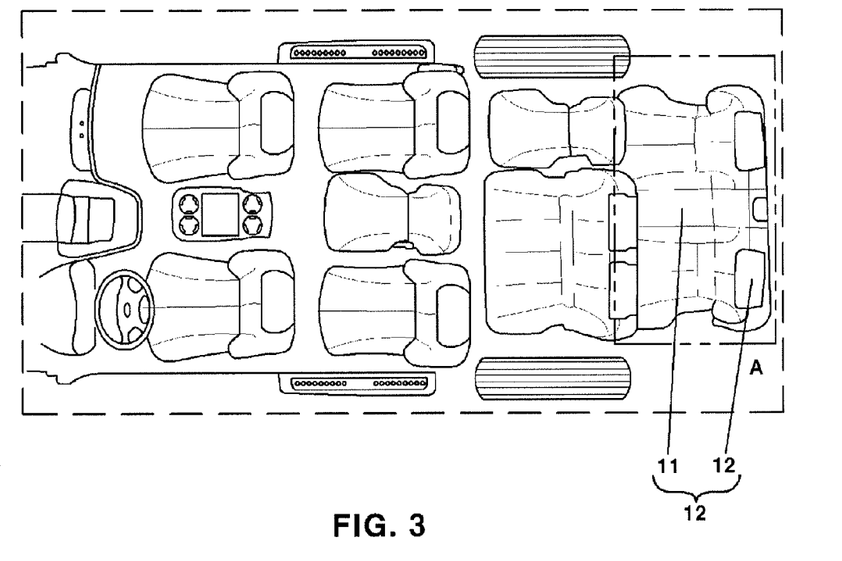
FIG. 3 is a plan view showing the structure of a multi-purpose vehicle in accordance with an exemplary embodiment of the present invention.
Figure 4:
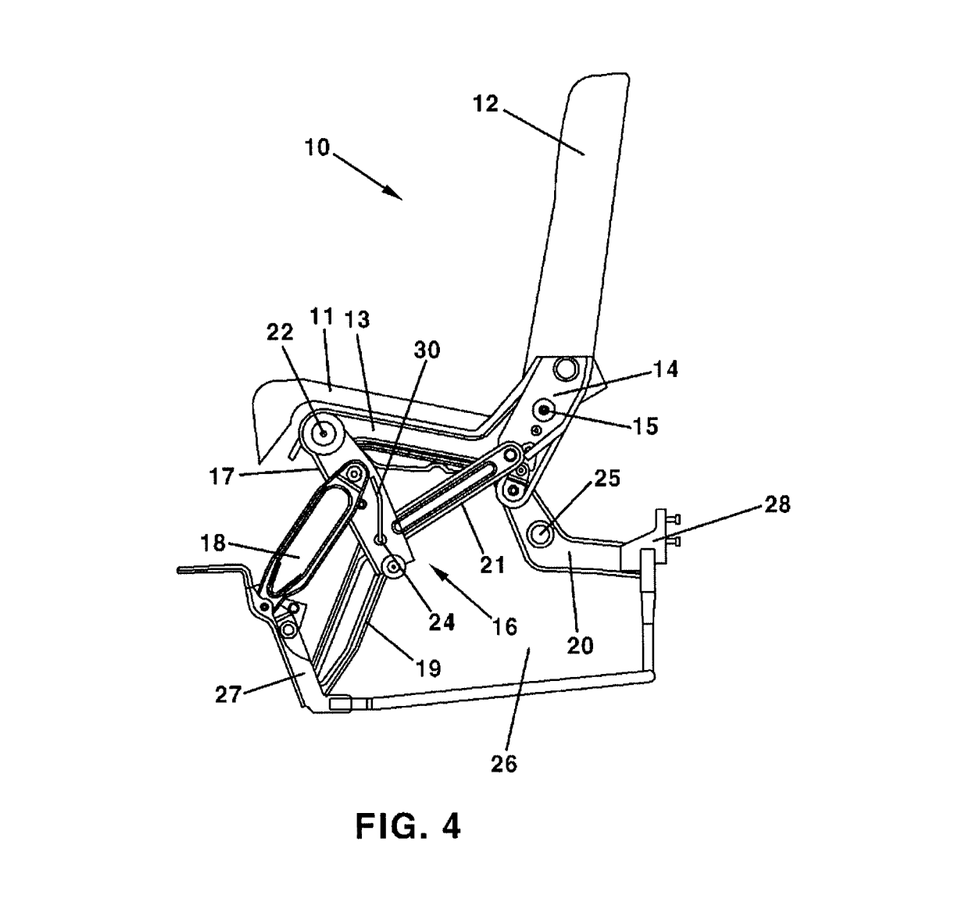
FIG. 4 is a side view showing the structure of a rear seat of portion-A of FIG. 3.
Figure 5:
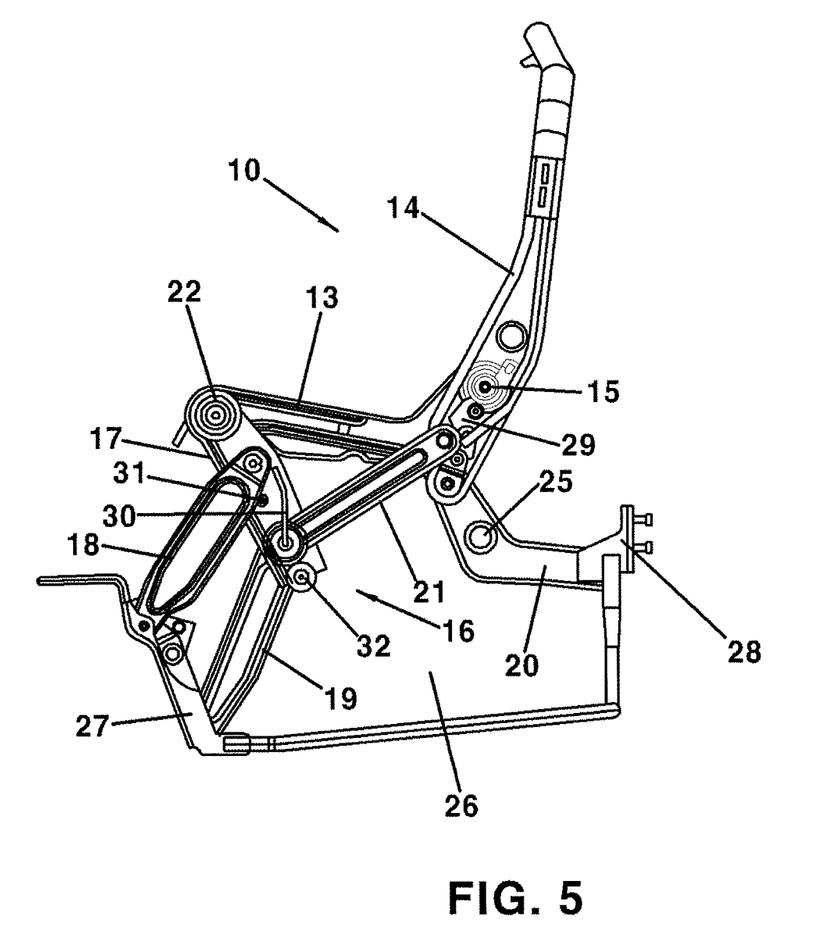
FIG. 5 is a side view showing the structure of a seat frame of FIG. 4.
Figure 6:
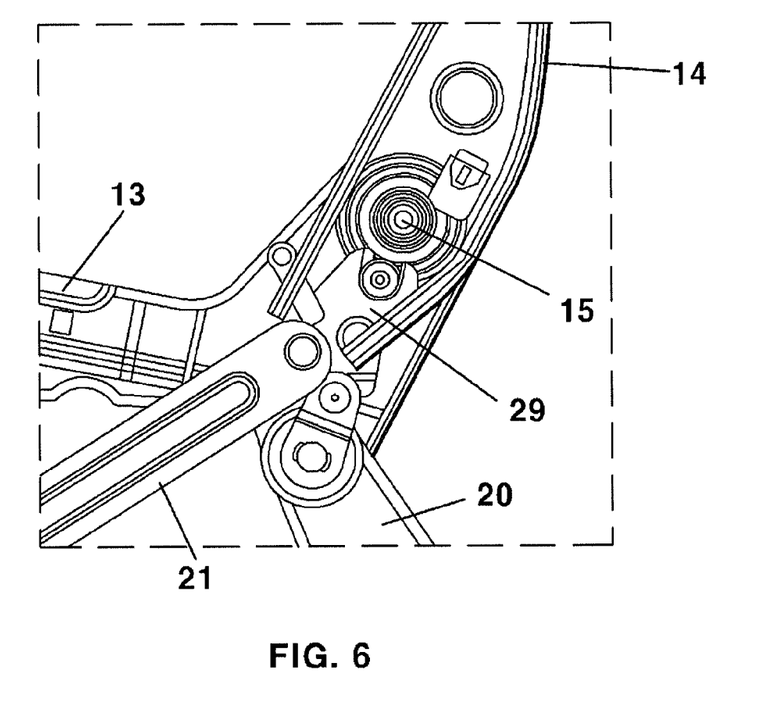
FIG. 6 is a partially enlarged view of FIG. 5.

FIG. 3 is a plan view showing the structure of a multi-purpose vehicle in accordance with an exemplary embodiment of the present invention, FIG. 4 is a side view showing the structure of a rear seat of portion-A of FIG. 3, FIG. 5 is a side view showing the structure of a seat frame of FIG. 4, and FIG. 6 is a partially enlarged view of FIG. 5.

The present invention provides a seat apparatus for a vehicle, in which a rear seat can be moved up and folded using a link member 16, thereby providing sufficient luggage space and passenger space.

The seat apparatus for a vehicle in accordance with an exemplary embodiment of the present invention can be applied to a rear seat 10 located at the outermost end of a vehicle provided with four rows of seats.

According to an exemplary embodiment of the present invention, a concave storage space 26 is provided at the bottom of a floor 100 such that the rear seat 10 can be stored in the storage space 26, thereby providing sufficient passenger space and luggage space.

The storage space 26 is formed to be concave at the bottom of the floor where the rear seat 10 is located at the fourth position from the front to the rear of the four rows of seats such that, when the rear seat 10 is completely stored in the storage space 26, the upper surface of a seat back 12 is located on the same plane as the floor, thereby providing sufficient passenger space and luggage space.

A seat cushion 11 and the seat back 12 have a cushion link 13 and a back link 14 at both sides, respectively, and the lower end of the back link 14 is hinge-connected to the rear end of the cushion link 13 with respect to a hinge portion 15 such that the upper end of the back link 14 can rotate toward the seat cushion 11.

The link member 16 for storing the rear seat 10 in the storage space 26 includes a first link 17 for supporting the front end of the seat cushion 11 from the bottom, second and third links 18 and 19 for connecting between the first link 17 and a vehicle body, a fourth link 20 for supporting the rear end of the seat cushion 11 from the bottom, and a folding guide link 21 for connecting the first link 17 and the back link 14.

First and second shafts 22 and 23 for connecting the cushion links 13 are provided at the front end and the rear end of the cushion links 13 located at both sides of the seat cushion 11.

The upper end of the first link 17 is hinge-connected to the front end of the cushion link 13 by the first shaft 22, and thus the lower end of the first link 17 can rotate back and forth with respect to the first shaft 22.

Here, when the seat back 12 is unfolded such that a passenger can sit on the rear seat 10 (in a seating position), the first link 17 is inclined at the rear of a vertical line passing through the first shaft 22 and, when the rear seat 10 is completely stored in the storage space 26 (in a storage position), the first link 17 is laid adjacent to the bottom of the storage space 26.

A third shaft 24 is connected between the lower ends of the first links 17 to connect the lower ends of the first links 17.

The second link 18 and the third link 19 connect the first links 17 and the vehicle body such that the first links 17 can be rotated.

Here, the vehicle body represents the location where the storage space 26 is provided and shall be understood as having the same meaning as the storage space 26.

Moreover, a front bracket 27 and a rear bracket 28 are provided on the front wall and the rear wall of the storage space 26, respectively, to fix the second to fourth links 18 to 20.

The upper end of the second link 18 is hinge-connected to the middle of the first link 17, and the lower end of the second link 18 is hinge-connected to the front upper end of the storage space 26 by the front bracket 27 such that the upper end of the second link 18 rotates with respect to the lower end of the second link 18, thereby rotating the first link 17.

The upper end of the third link 19 is hinge-connected to the lower end of the first link 17 by the third shaft 24, and the lower end of the third link 19 is hinge-connected to the front lower end of the storage space 26 by the front bracket 27 such that the upper end of the third link 19 rotates with respect to the lower end of the third link 19, thereby rotating the first link 17.

The middle of the fourth link 20 is bent at a predetermined angle to have an internal angle of about 120°, and a fourth shaft 25 is provided in the middle of the fourth link 20 to connect the fourth links 20.

The upper end of the fourth link 20 is hinge-connected to the rear end of the cushion link 13 by the second shaft 23, and the lower end of the fourth link 20 is hinge-connected to the rear upper end of the storage space 26 by the rear bracket 28 such that the upper end of the fourth link 20 can rotate up and down with respect to the lower end of the fourth link 20.

Here, when the seat back 12 is unfolded such that the passenger can sit on the rear seat 10 (in the seating position), the rear end of the fourth link 20 is horizontally located at the rear of a vertical line passing through the second shaft 23 and, when the rear seat 10 completely stored in the storage space 26 (in the storage position), the lower end of the fourth link 20 is located adjacent to the bottom of the storage space 26.

First and second stoppers 31 and 32 are provided on one side of the first link 17 and, when the seat back 12 is unfolded, the lower end of the first link 17 rotates forward, and thus the first and second stoppers 31 and 32 are stopped by the upper ends of the second and third links 18 and 19, thereby stopping the first link 17.

When the seat back 12 is pushed toward and folded, the folding guide link 21 serves to pull the lower end of the first link 17 backward to be rotated.

To this end, the upper end of the folding guide link 21 (when the rear seat is in the seating position) is hinge-connected to the lower end of the back link 14, and the lower end of the folding guide link 21 is hinge-connected to the lower end of the first link 17 by the third shaft 24 such that, when the folding guide link 21 rotates, the lower end of the first link 17 can be pulled backward.

In order to maintain the unfolded state of the seat back 12, a locking device such as a latch 29, for example, is provided in the hinge portion 15 of the seat back 12, and thus, when the seat back 12 is unfolded backward, the cushion link 13 and the back link 14 can be maintained in the unfolded state by the locking device.

Moreover, a release lever for releasing the locking device is provided on one side of the seat back 12 in such a manner that one end of the release lever is pulled by a user and the other end of the release lever is connected to the locking device such that, when the release lever is pulled, the locking device is released, thereby folding the seat back 12 toward the seat cushion 11.

In order to pop up the seat back 12 and the seat cushion 11 after the locking device is released, a torsion bar 30 is provided at the connection between the first link 17, the fourth link 20, and the folding guide link 21 in such a manner that one end of the torsion bar 30 is fixed to the first link 17 and the other end of the torsion bar 30 is fixed to the third link 19.

Therefore, when the seat back 12 is unfolded such that the passenger can sit on the rear seat 10, the folded first and third links 17 and 19 are unfolded by the elastic restoring force of the torsion bar 30, and thus the seat back 12 and the seat cushion 11 can be moved up.

The operation of the seat apparatus for a vehicle having the above-described configuration in accordance with the present invention will be described below.

Figure 7:
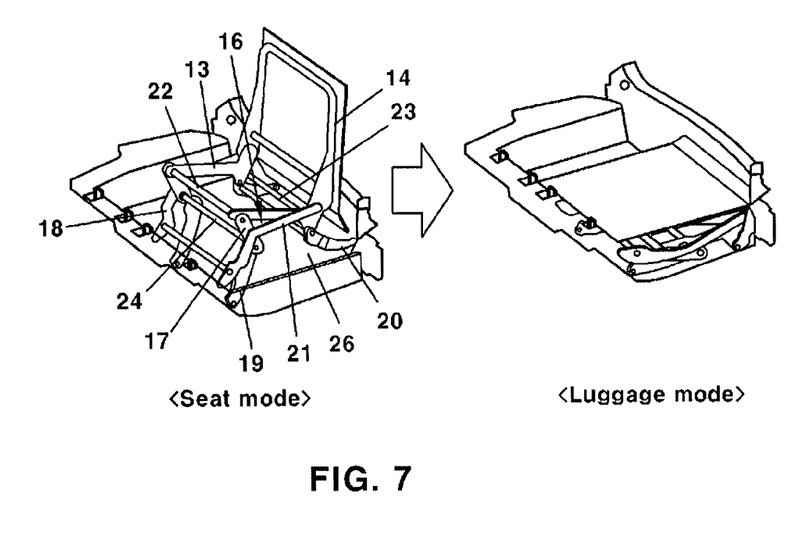
FIG. 7 is a perspective view showing a seat mode and a luggage mode of a seat apparatus in accordance with the present invention.
Figure 8:
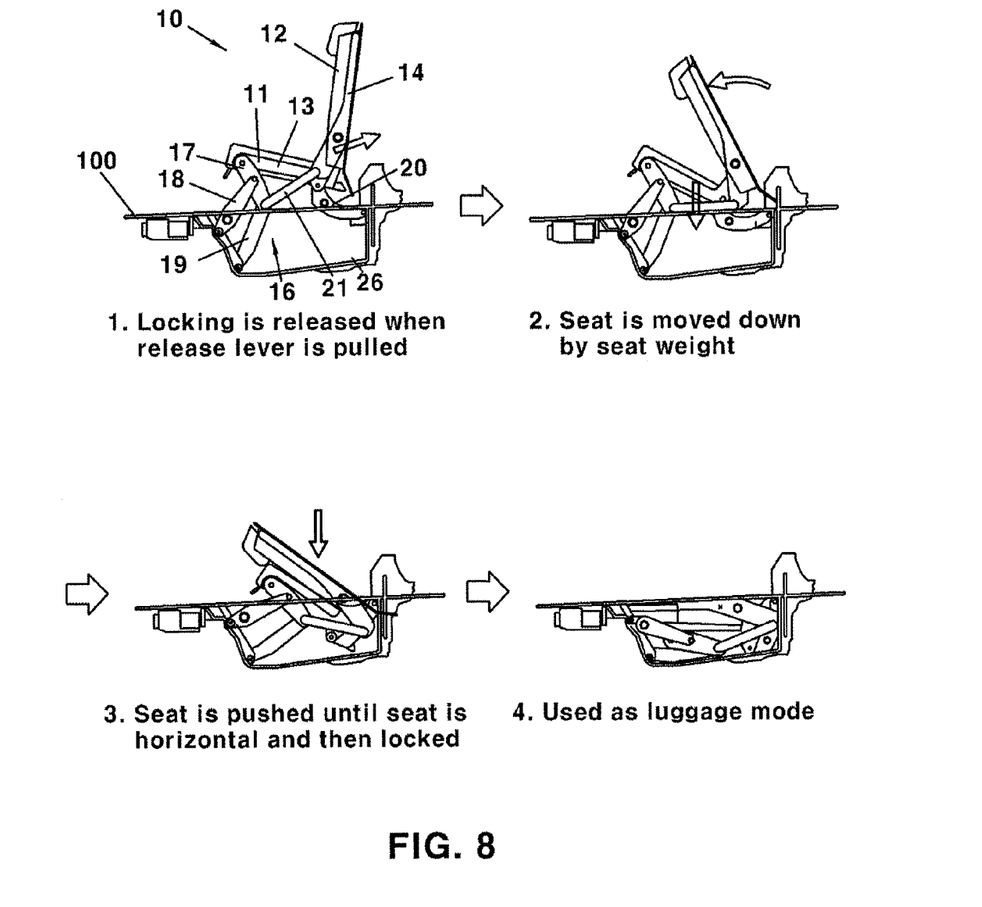
FIG. 8 is a view showing the operation of the seat apparatus of FIG. 7 during switching to the luggage mode.
Figure 9:
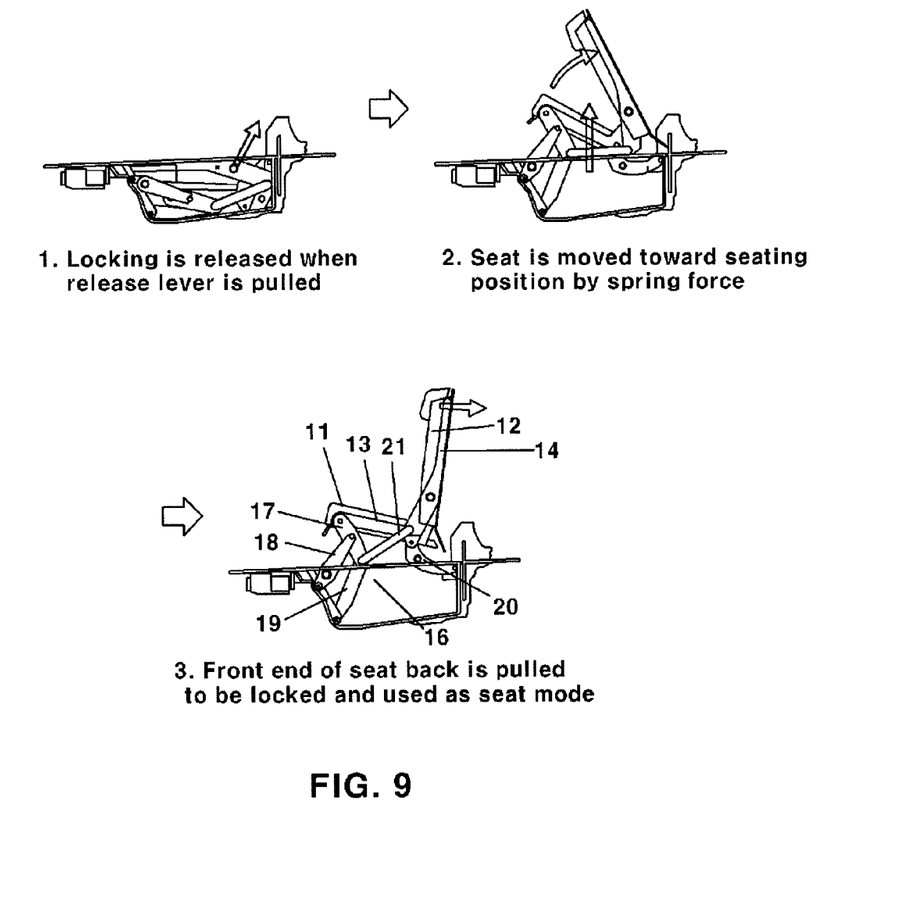
FIG. 9 is a view showing the operation of the seat apparatus of FIG. 7 during switching to the seat mode.

FIG. 7 is a perspective view showing a seat mode and a luggage mode of the seat apparatus in accordance with the present invention, FIG. 8 is a view showing the operation of the seat apparatus of FIG. 7 during switching to the luggage mode, FIG. 9 is a view showing the operation of the seat apparatus of FIG. 7 during switching to the seat mode.

The seat apparatus for a vehicle in accordance with the present invention can switch to the luggage mode and the seat mode depending on the user's needs, which will be described with respect to each mode.

Luggage Mode

In the luggage mode, the rear seat 10 is stored in the storage space 26 to provide a sufficient luggage space.

Here, when the rear seat 10 is completely stored in the storage space 26, the seat back 12 of the rear seat 10 is located on the same plane as the floor, and thus the seat apparatus has the effect of removing the rear seat 10 located at the outermost end of the vehicle provided with four rows of seats. As a result, the luggage can be stored in the space previously occupied by the rear seat 10, thereby providing a sufficient luggage space.

In order to store the rear seat 10, the release lever is operated to unlock the locking device.

As the locking device is unlocked, the seat back 12, the seat cushion 11, and the link member 16 are changed from a fixed state to a movable state.

That is, the seat back 12 is folded toward the seat cushion 11, and the seat cushion 11 and the seat back 12 can be moved down by the link member 16.

In more detail, when the upper end of the seat back 12 is pushed forward, the seat back 12 is folded toward the seat cushion 11 and, at the same time, the seat cushion 11 and the seat back 12 are moved down by the weight of the rear seat 10. Here, the seat back 12 rotates with respect to the hinge portion 15 (i.e., a connection between the seat back 12 and the seat cushion 11 and located slightly above the lower end of the seat back 12), the fourth link 20 rotates toward the bottom of the storage space 26, and the rear end of the seat cushion 11 is moved down earlier than the front end of the seat cushion 11. As a result, the rear end of the folding guide link 21 connected to the lower end of the seat back 12 is pulled, and thus the seat back 12 is moved down.

Continuously, the folding guide link 21 pulls the lower end of the first link 17 backward, and thus the second and third links 18 and 19 connected to the first link 17 are rotated toward the inside of the storage space 26. Then, the seat back 12 is pushed until the seat back 12 is horizontal and then fixed by the locking device.

(2) Seat Mode

In the seat mode, the rear seat 10 is unfolded from the storage space 26 to provide a passenger space where the passenger can sit.

In order to unfold the rear seat 10, when the locking device is released by pulling the release lever, the stored rear seat 10 can be moved up and unfolded by the elastic restoring force of the torsion bar 30.

At this time, as the first and third links 17 and 19 are opened by the elastic restoring force of the torsion bar 30, the second and third links 18 and 19 are rotated to stand upward such that the front end of the seat cushion 11 rises, thereby raising the rear end of the seat cushion 11.

Moreover, as the folding guide link 21 connected to the lower end of the first link 17 is pulled, the rear end of the seat back 12 is rotated forward, and thus the seat back 12 is slightly opened from the seat cushion 11.

While the seat back 12 and the seat cushion 11 are popped up by the elastic restoring force of the torsion bar 30, the seat back 12 is completely pulled, and thus the rear seat 10 is fixed by the locking device such that the passenger can sit on the rear seat 10.

Here, when the rear seat 10 is completely unfolded, the first link 17 rotates with respect to the first shaft 22 and is locked to the second and third links 18 and 19 by the first and second stoppers 31 and 32, thereby stopping the seat cushion 11 and the seat back 12. Then, the seating position of the rear seat 10 is maintained by the locking device.

As described above, the seat apparatus for a vehicle according to an exemplary embodiment of the present invention provides the following advantages.

First, the storage space of the rear seat is provided at the bottom of the floor such that the rear seat is stored in the storage space with simple manipulation using the link member, thereby providing a sufficient luggage space and improving the merchantability.

Second, the conventional slide rail applied to provide the luggage space can be eliminated, and thus the weight and manufacturing cost of the vehicle can be reduced. Moreover, the rear seat can be popped up by the torsion bar, and thus the operating force can be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat apparatus for a vehicle, in which a seat back is foldable toward a seat cushion of a seat, the seat apparatus comprising:
    a storage space provided at the bottom of a floor and storing the seat to provide a luggage space in the vehicle;
    a link member pivotally connected between a cushion link of the seat cushion and the storage space such that the seat is foldable to be stored in the storage space;
    a locking device provided on the seat back to maintain an unfolded or folded state of the seat back; and
    an elastic member provided on the link member to pop up the cushion link and the seat back out of the storage space when the seat back is unfolded;
    wherein the link member includes:
        a first link pivotally connected to a front end of the cushion link to be moved up and down;
        second and third links connected to the first link and the storage space and pivotally supporting the first link; and
        a fourth link connected between a rear end of the cushion link and the storage
    space and pivotally supporting the rear end of the cushion link to be moved up and down,
    wherein an upper end of the second link is hinge-connected to a middle portion of the first link, and a lower end of the second link is hinge-connected to a front upper end of the storage space;
    wherein an upper end of the third link is hinge-connected to a lower end of the first link by a third shaft, and a lower end of the third link is hinge-connected to a front lower end of the storage space.

2. A seat apparatus for a vehicle, in which a seat back is foldable toward a seat cushion of a seat, the seat apparatus comprising:
    a storage space provided at the bottom of a floor and storing the seat to provide a luggage space in the vehicle;
    a link member pivotally connected between a cushion link of the seat cushion and the storage space such that the seat is foldable to be stored in the storage space;
    a locking device provided on the seat back to maintain an unfolded or folded state of the seat back; and
    an elastic member provided on the link member to pop up the cushion link and the seat back out of the storage space when the seat back is unfolded;
    wherein the link member includes:
        a first link pivotally connected to a front end of the cushion link to be moved up and down;
        second and third links connected to the first link and the storage space and pivotally supporting the first link; and
        a fourth link connected between a rear end of the cushion link and the storage
    space and pivotally supporting the rear end of the cushion link to be moved up and down;
    wherein the link member further comprises a folding guide link pivotally connected to a lower end of the seat back directly and a lower end of the first link, the folding guide link pulling the lower end of the first link such that the first, second and third links are folded when the seat back is folded.

3. The seat apparatus of claim 1, further comprising first and second stoppers provided on the first link and selectively engaged with the second and third links respectively to fix the positions of the cushion link and the seat back, wherein when the seat is moved up and unfolded, the first link rotates and is then stopped by the first and second stoppers, and thus the upward movement and unfolding of the seat is stopped.

4. The seat apparatus of claim 1, wherein the elastic member is connected to the first link and the third link.

5. The seat apparatus of claim 4, wherein the elastic member is a torsion bar.

6. The seat apparatus of claim 1, wherein the elastic member is a torsion bar.

* * * * *